US008728613B2

(12) United States Patent
Jones et al.

(10) Patent No.: US 8,728,613 B2
(45) Date of Patent: May 20, 2014

(54) IDENTIFICATION DOCUMENTS INCLUDING ANTI-COUNTERFEITING FEATURES PROVIDING TAMPER EVIDENCE

(75) Inventors: Robert L. Jones, Andover, MA (US); Daoshen Bi, Boxborough, MA (US); Mohamed Lazzouni, Northborough, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 0 days.

(21) Appl. No.: 12/752,496

(22) Filed: Apr. 1, 2010

(65) Prior Publication Data

US 2011/0033675 A1 Feb. 10, 2011

Related U.S. Application Data

(60) Provisional application No. 61/167,410, filed on Apr. 7, 2009.

(51) Int. Cl.

| | |
|---|---|
| ***B32B 7/06*** | (2006.01) |
| ***B32B 7/14*** | (2006.01) |
| ***B41M 5/00*** | (2006.01) |
| ***B32B 3/00*** | (2006.01) |
| ***D21H 21/46*** | (2006.01) |
| ***G03G 7/00*** | (2006.01) |

(52) U.S. Cl.
USPC ........ 428/199; 428/202; 428/203; 428/32.18; 428/195.1; 235/468; 235/488

(58) Field of Classification Search
None
See application file for complete search history.

(56) References Cited

U.S. PATENT DOCUMENTS

| | | | | |
|---|---|---|---|---|
| 4,184,701 | A | 1/1980 | Franklin | |
| 5,683,774 | A | 11/1997 | Faykish | |
| 6,214,443 | B1 | 4/2001 | Palmasi | |
| 6,523,859 | B2 * | 2/2003 | Scheggetman et al. | 283/70 |
| 7,097,899 | B2 * | 8/2006 | Daems et al. | 428/204 |
| 2005/0247794 | A1 * | 11/2005 | Jones et al. | 235/487 |
| 2006/0151993 | A1 * | 7/2006 | Nemeth | 283/107 |
| 2006/0228530 | A1 * | 10/2006 | Bi et al. | 428/195.1 |
| 2006/0234014 | A1 | 10/2006 | Liu | |

FOREIGN PATENT DOCUMENTS

| | | | |
|---|---|---|---|
| DE | 102007044482 | A1 | 3/2009 |
| EP | 2581232 | A2 | 4/2013 |
| EP | 2581233 | A2 | 4/2013 |

OTHER PUBLICATIONS

European Search Report for Application No. EP 10159149, dated Dec. 2, 2011, 8 pages.

* cited by examiner

*Primary Examiner* — Mark Ruthkosky
*Assistant Examiner* — Laura C Powers
(74) *Attorney, Agent, or Firm* — Fish & Richardson P.C.

(57) ABSTRACT

An identification document which includes anti-counterfeiting features to provide tamper evidence in response to counterfeiting attempts includes an image receiving area having one or more fixed or variable items of information. In one embodiment, a pattern of material is embedded into the image receiving layer in the vicinity of the one or more fixed or variable items of information in a predetermined configuration. The embedded pattern is comprised of a solvent insoluble material such that attempted delamination of the document using solvents results in visually detectable tampering.

8 Claims, 3 Drawing Sheets

IDENTIFICATION DOCUMENTS INCLUDING ANTI-COUNTERFEITING FEATURES PROVIDING TAMPER EVIDENCE

RELATED APPLICATION

This application is related to and claims priority to provisional application Ser. No. 61/167,410, filed Apr. 7, 2009, the entirety of which is herein incorporated by reference.

FIELD OF THE INVENTION

Anti-counterfeiting features of identification documents provide tamper evidence in response to counterfeiting attempts employing solvent delamination or other attacks to alter or obtain personal images and data from the identification documents.

SUMMARY OF THE INVENTION

The present disclosure is directed to an identification document which includes anti-counterfeiting features providing tamper evidence due to solvent attacks. One embodiment of the present disclosure is directed to identification document having an inner core layer of material having upper and lower surfaces; an image receiving layer disposed on at least one of the upper and lower surfaces of the inner core layer; the image receiving layer having one or more fixed variable items or information thereon; a pattern of material embedded into the image receiving layer in the vicinity of the one or more fixed or variable items of information and in a predetermined configuration; the embedded pattern further intruding into the inner core layer; a laminate layer disposed over the image receiving layer and embedded pattern; and wherein, attempted delamination of the document using solvents results in visually detectable tampering. In addition, the embedded pattern may be comprised of a solvent insoluble material wherein the embedded pattern is a monomer material which, after contacting the at least one or more fixed or variable items information, is cured to polymerize the pattern.

In another embodiment an identification document is described having an inner core layer of material having upper and lower surfaces; the inner core layer being substantially cut through from the upper surface through the lower surface to form a scored pattern; an image receiving layer disposed on at least the upper surface of the core layer and bonded to the core layer; a laminate layer disposed on the image receiving layer and bonded to the image receiving layer; a release material layer disposed on the lower surface of the inner core layer and bonded to the core layer; the bonding strength of the core layer to the image receiving layer and the laminate layer being greater than the bonding strength of the release material layer to the core layer; and, wherein, attempted delamination of the document results in the scored pattern in the core layer being adhered to the image receiving and laminate layers to visually evidence tempering.

In addition, a further embodiment describes an identification document having: an inner core layer of material having upper and lower surfaces; and image receiving layer disposed on at least one of the upper and lower surfaces of the inner core layer; the image receiving layer having one or more fixed or variable items of information thereon; the one or more fixed or variable information items including a ghost image; the ghost image being printed on the image receiving layer using a monochromatic ink jet ink; the ink jet ink including a dye which is soluble in solvents; and, wherein, attempted delamination of the document using solvents results in the ink forming the ghost image bleeding to evidence tampering of the document.

Details of one or more implementations are as set forth in the accompanying drawings and in the description below. Further features, aspects, and advantages will become apparent from the description, the drawings, and the claims.

DETAILED DESCRIPTION

Figure 1:
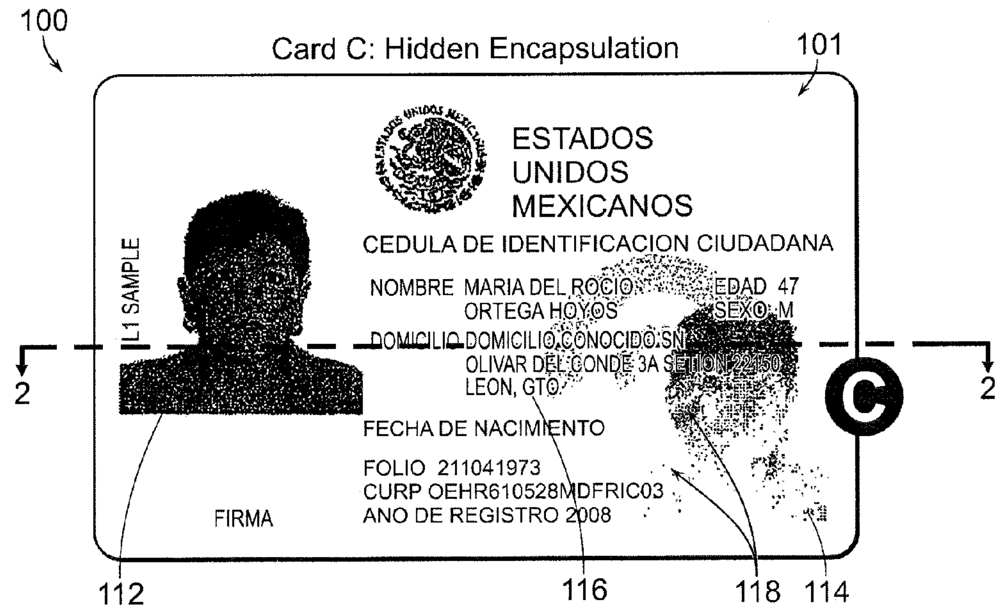
FIG. 1 is a schematic diagram of a first or front face of an identification card including an anti-counterfeiting feature according to one aspect of the invention comprising hidden encapsulated data.
Figure 2:
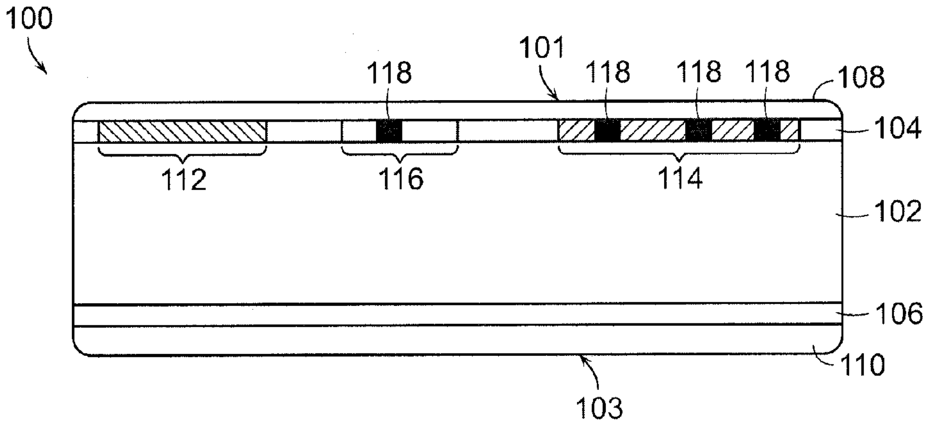
FIG. 2 is a cross-sectional view of the card shown in FIG. 1.

Referring to FIGS. 1 and 2, in one aspect, the invention provides an identification document, such as, for instance, an identification card 100 that includes one or more anti-counterfeiting features that provide tamper evidence in response to solvent or other types of counterfeiting attacks on the card 100. The identification card 100 includes a core 102, e.g., constructed of a polymer material such as Teslin®, a first or front laminate layer 108 along a first or front face 101 of the card 100, and a second or back laminate layer 110 along a second or back face 103 of the card 100. Additionally, the card 100 may include image receiving layers 104 and 106 disposed between each side of core 102 and laminate layers 108 and 110, as is shown in FIG. 2.

The card 100 includes one or more of an image of the card bearer 112 and other fixed or variable personal information 116 related to the card bearer including, but not limited to, a residential address of the card bearer. Additionally, the card 100 may include a ghost image 114 of the image 112 of the card bearer.

The invention provides the card 100 with a predetermined anti-counterfeiting pattern 118 disposed along the front face 101 of the card 100, such that, at least a portion of the pattern 118 covers at least a portion of the image 112, ghost image 114, and/or other personal information 116. The pattern may be applied prior to the first or front laminate layer 108 being applied over the image receiving layer 104. As explained below, the pattern 118 embeds and/or encapsulates at least a portion of the image 112, the ghost image 114, and/or the other information and data 116 within the pattern 118. One method known in the art is to apply the pattern 118 to the front face 101 of the card 100, such that, after application of the front laminate layer 108 to the front face 101 of the card 100, the pattern 118 is not visually or tactilely detectable. A prospective counterfeiter therefore cannot detect the presence of the pattern 118 along the card 100 until, as described below, the card 100 is compromised or damaged as a result of attempted counterfeiting attacks, such as by solvent delamination.

The term "pattern" 118 refers to and comprises any of a variety of configurations, geometric or non-geometric shapes that can be applied to at least a portion of the image 112, ghost image 114, and/or other personal information 116 as a random display, a non-repetitive series, and/or a repetitive series or pattern of configurations or shapes. As shown in FIG. 1, the pattern 118, illustrated by way of example only, includes a series of concentric circles along the front face 101 of the card 100. The invention is not limited to the pattern 118 shown in FIG. 1 and it is anticipated that the pattern 118 may comprise any of a series of configurations or shapes as noted.

The pattern 118 is applied to the front face 101 subsequent to printing or application of the image 112, ghost image 114 and/or other personal information 116 of layer 104 to the card 100. The pattern 118 is applied as a coating according to one or more methods or techniques known in the art as a layer of a clear monomer solution, e.g., in a predetermined pattern, over at least a portion of the image 112, ghost image 114 and/or other personal information 116. The coated pattern 118 is subsequently exposed to UV or other radiation to cure, or, in other words, to crosslink, the monomer of the solution to form a polymer insoluble in a solvent. Hence, the patterned coating or a layer defining the pattern 118 along the front face 101 of the card 100 is non-solvent soluble. The coated pattern 118 in effect covers or embeds within portions of the image 112, the ghost image 114, and/or the personal information 116 as shown in FIG. 2. In addition, at least some of the monomer solution and/or the cured polymer may penetrate and intrude into the core 102 and/or the image receiving layer 104, if present, such that, the pattern 118 encapsulates the image 112, ghost image 114, and/or personal information 116, again as shown in FIG. 2.

The cured polymer has substantially the same index of refraction as the material comprising the core 102 and/or the image receiving layer 104, if present, such that, the resulting polymer pattern 118 is clear or invisible. The pattern 118 coating or layer that results is a solid, relatively hard, invisible and solvent insoluble pattern. Upon application of the first laminate layer 108, the pattern 118 has no substantial visual or tactile presence along the card 100. In one configuration of the invention, the monomer solution includes a 100% solids monomer acrylate solution; however, the invention is not so limited and other monomers may be employed suitable to form a clear or invisible cured polymer pattern 118 coating or layer.

Solvent counterfeiting attacks may be employed to delaminate or otherwise separate the layers of the card 100 to retrieve images and other data, intrude upon the interfaces between the pattern 118 and the image 112, ghost image 114, and/or personal information 116. Attempts to remove, for instance, the first laminate layer 104, e.g., via soaking the card 100 in a solvent, will result in removal of those portions of the image 112, ghost image 114 and/or the personal information 116 that are not under or embedded in the pattern 118 with the removal of the first laminate layer 104 from the card 100. Portions of the image 112, ghost image 114, and/or other personal information 118 under or embedded in the pattern 118 remain attached firmly to the core 102 or the image receiving layer 104, if present, causing visually detectable tampering. In addition, solvent attacks will not dissolve the solvent-insoluble pattern 118 to expose the underlying embedded or encapsulated portions of the image 112, ghost image 114, and/or other personal information 116. Therefore, physical removal of the pattern 118 from the underlying images and/or personal information could be attempted, but that would damage the core 102, and the imaging receiving layer 104 if present, resulting in visually detectable tampering of the card 101. As one cannot detect the pattern 118 visually or tactilely after the first laminate layer 108 is applied to the card 100, attempted solvent or other physical attacks to the card 100 to remove its images or other data would be unsuccessful and detectable.

Figure 3:
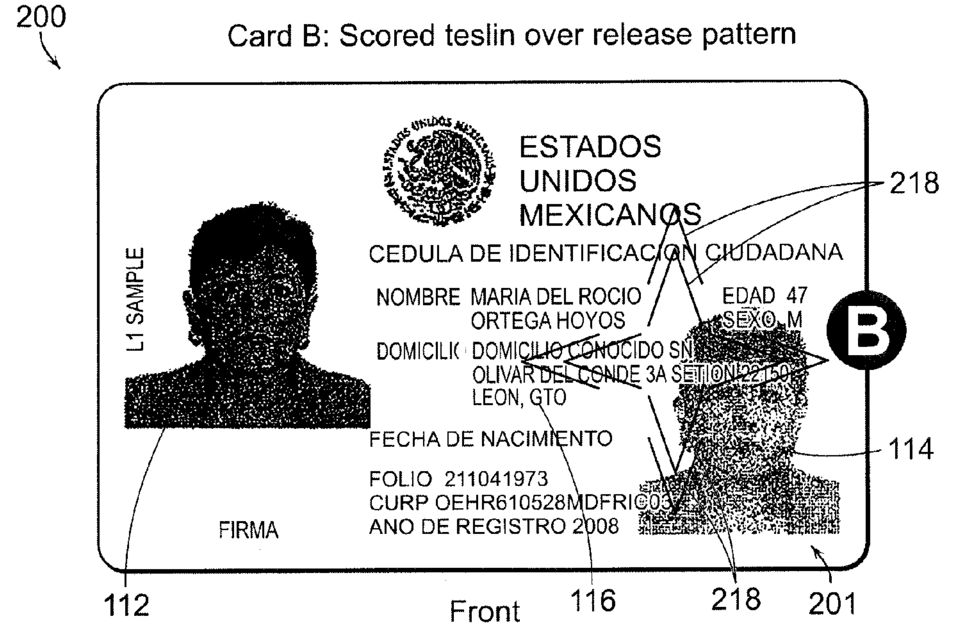
FIG. 3 is a schematic diagram of a first or front face of an identification card including an anti-counterfeiting feature according to another aspect of the invention comprising a plurality of score or die cut lines in combination with a release layer.
Figure 4:
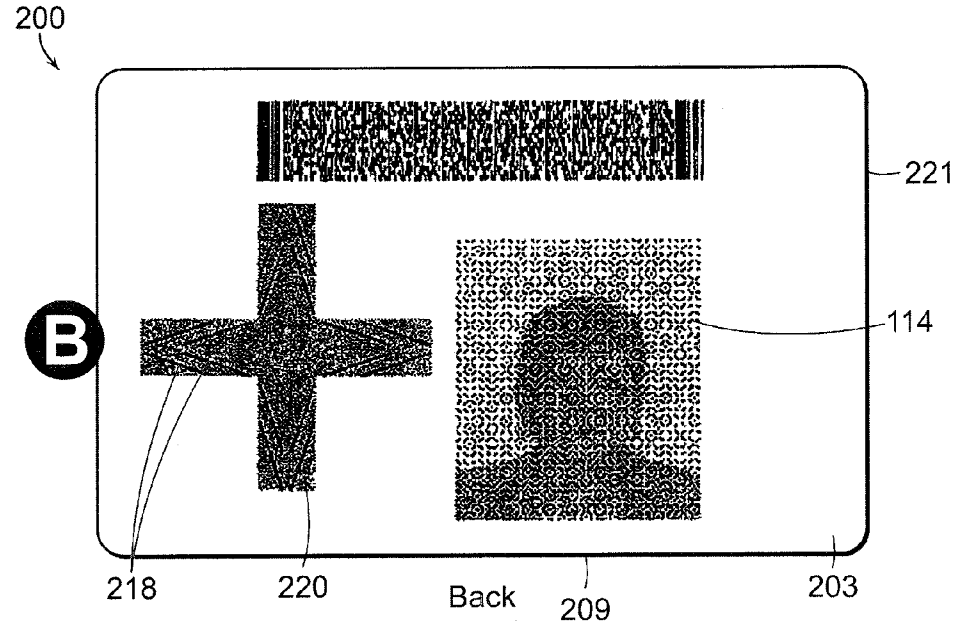
FIG. 4 is a schematic diagram of a second or back face of the card shown in FIG. 3.
Figure 5:
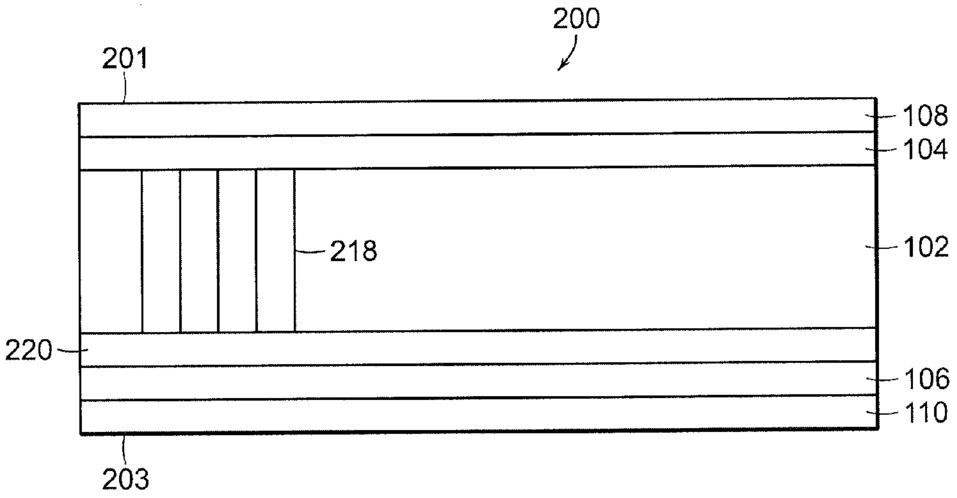
FIG. 5 is a cross-sectional view of the card shown in FIGS. 3 and 4.

Referring to FIGS. 3-5, in another aspect, the invention provides an identification document, such as, for instance, an identification card 200 that may have an architecture similar to the architecture of the card 100 described above with reference to FIGS. 1 and 2, and including one or more anti-counterfeiting features that tear the material(s) constructing the core 102 of the card 200 in order to provide tamper evidence in response to solvent or other types of counterfeiting attacks on the card 200. The card 200 includes, in addition to the core 102, the first or front laminate layer 108, the second or back laminate layer 110, and, optionally, an image receiving layer 104 and 106 along each surface of the core 102 as shown in FIG. 2.

The anti-counterfeiting feature includes a plurality of score or die cut lines 218 through or nearly through the core 102 in combination with a layer 220 of release type material along a back surface of the card 200 in contact with core 102. The card 200 architecture is constructed such that the bonding properties of a front surface of the core 102 (along the front face 201 of the card) to the front laminate layer 108 are greater than the bonding properties of the release layer 220 along a back surface of the core 102 (along the back face 203 of the card 200) to the back laminate layer 110. As a result, removal of the front laminate layer 108 from the card 200 during solvent delaminating attacks causes the core 102 to tear along its front surface along the score or die cut lines 218, such that the core 102 tears from front to back as the front laminate layer 108 is removed from the card 200. Tearing of the core 102 is already started with the plurality of score or die cut lines 218 cut through or nearly through core 102 and continues because the core 102 remains bonded to the front laminate layer 108, while it is not bonded along the same areas to the back laminate layer 110. Because the bond between the front surface of the core 102 with the front laminate layer 108 is greater than the bond between the release layer 220 and the back laminate layer 110, the core 102 remains bonded to the front laminate layer 108 and tears along the score or die cut lines as a result of the greater bonding force. The removal of the front laminate layer 108 as a result of a solvent delamination attack results in damage, e.g., tearing, of the image 114 and/or personal information 116.

The core 102 is scored or cut therethrough or nearly cut through with the plurality of score or die cut lines 218 in a pattern, as shown in FIGS. 3 and 4, and/or in a random distribution, across at least a portion of an image and/or personal information, such as, for instance, the ghost image 114 and/or the personal information 116. In FIGS. 3 and 4, for example, the die cuts shown in FIG. 4 would correspond to the position of the front surface 201 having image 112. Corresponding to the location of the plurality of score or die cut lines 218 along the front surface 201, the layer of release material 220 is disposed along the back surface 203 in alignment with at least a portion of the plurality of score or die cut lines 218. In one configuration, the release layer 220 can be applied in a cross-like configuration, as shown in FIG. 4 but may be in any desirable shape.

The release type of material comprising the layer 220 includes, for instance, print UV toner that demonstrates little or no adhesion to the back laminate layer 110 and has lower bonding properties than the core 102 to the front laminate layer 108. Other materials may be employed to configure the release layer 220 including, but not limited, to any type of ink or other compounds that have little or no adhesion to the back laminate layer 110 and have lower bonding properties to the back laminate layer 110 than the core 102 has to the front laminate layer 108. The UV toner is particularly effective in producing tampering evidence in response to solvent attacks employing keytones, such as acetone, wherein the dye component of the UV toner bleeds through and along the core 102.

To ensure tearing of the core 102 from front to back, the bonding adhesion properties along the front surface of the card 102 at the locations of the score or die cut lines must be higher than the bonding adhesion properties of the release layer 220. Because areas printed along the front surface of the core 203 with toner are stronger after solvent immersion, such as during a solvent counterfeiting attack, maximizing areas printed with toner along and around the areas of the score or die cut lines helps to maximize the bond strength of the front surface of the core 102 to the front laminate layer 108 and to enable effective tearing of the core 102 along the score or die cut lines 218.

To take advantage of the grain of the material comprising the core 102 in assisting with the tearing of the core 102 in response to solvent or other counterfeiting attacks, the grain of the materials, such as, for instance, the machine direction (MD) grain of Teslin®, is placed in the long dimension 219 of the card 200 because it has been found that most, if not all, intrusion attempts are initiated from one of the short dimensions 221 of the card 200, as shown in FIG. 4.

Figure 6:
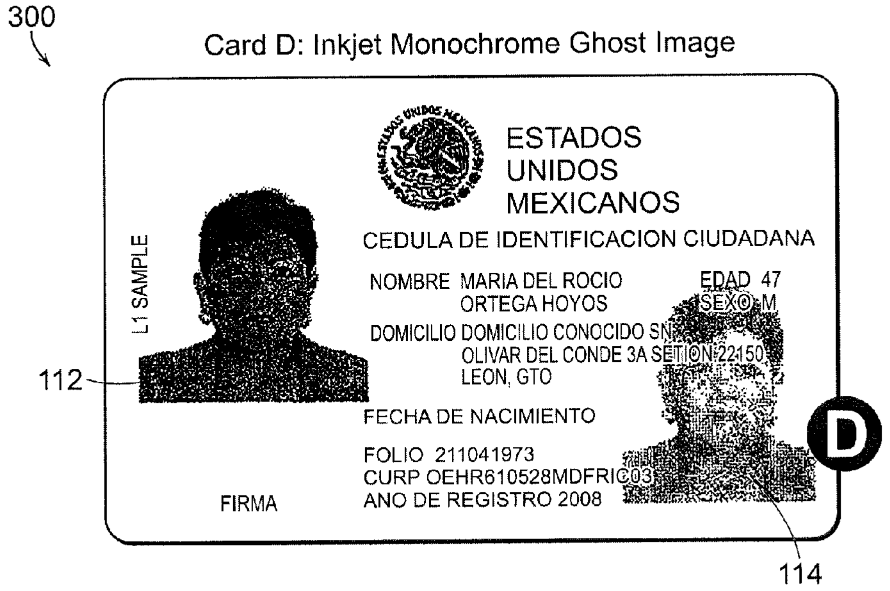
FIG. 6 is a schematic diagram of a first or front face of an identification card including an anti-counterfeiting feature according to a further aspect of the invention.

Referring to FIG. 6, in a further aspect, the invention provides an identification document, such as, for instance, an identification card 300 that may have an architecture similar to the architecture of the card 100 described above with reference to FIGS. 1 and 2, and may include an anti-counterfeiting feature that responds to solvent attacks. The invention applies the ghost image 114 of the image 112 of the card bearer to the core 102 via ink jet printing using a monochrome ink jet ink. Rather than applying the ghost image 114 employing xerographic printing means and techniques, the ghost image 114 is applied to the card 300 using ink jet printing means and techniques. In addition, a monochrome ink jet ink is employed that includes one or more dyes that are at least somewhat soluble in solvents that are used typically in solvent counterfeiting attacks. In one configuration, the dye of the ink jet ink has solubility in methanol and ethanol. In one configuration, the dye includes a monochrome blue dye. Where the card 300 is soaked in a solvent for delamination purposes, the dye of the monochrome ink jet ink image becomes at least somewhat soluble and migrates from the core 102 to such an extent that the dye is appears along the back surface of the card 300. The bleeding of the ink jet ink is visually obvious and provides tamper evidence that essentially destroys the utility of the core 102 to a prospective counterfeiter.

While the present invention has been disclosed and illustrated with reference to a identification document, it could also be modified and implemented with other valuable documents. For example, it could be used with media such as a bank card or a credit card or customer appreciation cards. Thus, while this invention is described as having exemplary design, the present invention may be further modified within the scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. An identification document comprising:
- an inner core layer having an upper surface and a lower surface;
- an image receiving layer disposed on at least one of the upper surface and the lower surface of the inner core layer;
- the image receiving layer having one or more items of information thereon;
- a pattern of material embedded into the image receiving layer within at least a portion of the one or more items of information and in a predetermined configuration;
- the embedded pattern of material intruding into the inner core layer, wherein the embedded pattern of material is formed from a monomer material which, after contacting at least one of the one or more items of information, is cured to polymerize the monomer material, thereby yielding the embedded pattern of material; and
- a laminate layer disposed over the image receiving layer and the embedded pattern of material,
- wherein attempted delamination of the identification document using a solvent results in visually detectable tampering; and
- wherein the embedded pattern of material in the image receiving layer and intruding into the inner core layer substantially remains with the inner core layer upon delamination.

2. The identification document of claim 1, wherein the monomer material is a 100% monomer acrylate solution.

3. The identification document of claim 1, wherein the polymerized embedded pattern of material is substantially clear.

4. The identification document of claim 1, wherein curing is effected by UV curing of the monomer material to polymerize the embedded pattern of material.

5. An identification document comprising:
- an inner core layer having an upper surface and a lower surface;
- the inner core layer being substantially cut through from the upper surface through the lower surface to form a scored pattern in the inner core layer;
- an image receiving layer disposed on at least the upper surface of the inner core layer and bonded to the inner core layer;
- a laminate layer disposed on the image receiving layer and bonded to the image receiving layer; and
- a release material layer disposed on the lower surface of the inner core layer and bonded to the inner core layer,
- wherein:
  - the image receiving layer comprises one or more items of information, and the scored pattern in the inner core layer is located within at least one of the items of information,
  - the release material layer is located in alignment with the scored pattern in the inner core layer,
  - the bonding strength of the inner core layer to the image receiving layer and the laminate layer is greater than the bonding strength of the release material layer to the inner core layer, and
  - attempted delamination of the identification document results in the scored pattern in the inner core layer being adhered to the image receiving layer and the laminate layer, thereby providing visual evidence of tampering.

6. The identification document of claim 5, wherein the release material layer comprises a print UV toner.

7. The identification document of claim 5, wherein the scored pattern in the inner core layer is fully cut through from the upper surface to the lower surface of the inner core layer.

8. The identification document of claim 1, wherein the one or more items of information is selected from the group consisting of:

an image of the identification document bearer, a ghost image of the identifier document bearer, and personal information of the bearer.

* * * * *